United States Patent [19]
Sassi

[11] Patent Number: 4,485,446
[45] Date of Patent: Nov. 27, 1984

[54] AIRCRAFT LIFT CONTROL SYSTEM WITH ACCELERATION AND ATTITUDE LIMITING

[75] Inventor: Alessandro P. Sassi, Bellevue, Wash.

[73] Assignee: The Boeing Company, Seattle, Wash.

[21] Appl. No.: 299,901

[22] Filed: Sep. 8, 1981

[51] Int. Cl.³ .............................................. G06G 7/78
[52] U.S. Cl. .................... 364/435; 244/181; 364/433
[58] Field of Search ............... 364/428, 433, 434, 435, 364/200; 244/180, 181, 183, 186; 318/583, 584

[56] References Cited

U.S. PATENT DOCUMENTS

| | | | |
|---|---|---|---|
| 3,681,580 | 8/1972 | Gwathmey et al. | 364/434 |
| 3,805,033 | 4/1974 | Manke et al. | 364/428 |
| 3,814,912 | 6/1974 | Manke et al. | 364/435 |
| 3,901,466 | 8/1975 | Lambregts | 244/180 |
| 4,019,702 | 4/1977 | Annin | 244/182 |
| 4,106,094 | 8/1978 | Land | 244/175 |
| 4,326,253 | 4/1982 | Cooper et al. | 364/435 |
| 4,347,572 | 8/1982 | Berwick, Jr. et al. | 364/433 |
| 4,390,950 | 6/1983 | Muller | 364/434 |

*Primary Examiner*—Jerry Smith
*Assistant Examiner*—Clark A. Jablon
*Attorney, Agent, or Firm*—Christensen, O'Connor, Johnson & Kindness

[57] ABSTRACT

An aircraft vertical lift guidance signal is developed for providing optimum aircraft lift with limiting to avoid excessive acceleration and attitude. A lift computer produces an angle of attack signal as a function of aircraft altitude rate minus longitudinal acceleration such that demand increases in acceleration result in an increased angle of attack, thereby limiting acceleration. Attitude limiting is achieved by limiting the longitudinal signal to a constant value in response to aircraft acceleration exceeding a reference level.

5 Claims, 4 Drawing Figures

AIRCRAFT LIFT CONTROL SYSTEM WITH ACCELERATION AND ATTITUDE LIMITING

BACKGROUND OF THE INVENTION

The present invention pertains to the aircraft control art and, more particularly, to an aircraft lift control system with acceleration and attitude limiting.

The prior art has developed numerous aircraft lift control guidance systems. Such systems are useful during climbout operations, particularly in adverse environmental conditions such as windshear, as an aid to the flight crew in utilizing the aircraft's capabilities to optimize lift.

A particularly effective aircraft lift control system is shown in FIG. 1. While this system is described in detail in U.S. Pat. No. 4,326,253, issued Apr. 20, 1982 and assigned to the same assignee as the present invention, a brief explanation of system operation is given herein. Angle of attack sensor block 10 monitors aircraft angle of attack and produces an output signal $\alpha$ representative thereof. The angle of attack signal $\alpha$ is combined in a summer circuit 12 with the output signal, $\alpha_{REF}$, from an optimum lift computer 14. Lift computer 14 receives an altitude rate signal, $\dot{h}$, from the altitude rate block 16. Lift computer 14 responds to the $\dot{h}$ signal to produce a continuously variable $\alpha_{REF}$ signal between maximum and minimum limits.

The angle of attack signal $\alpha$ is subtracted from the $\alpha_{REF}$, thereby producing an angle of attack error signal $\alpha_\epsilon$. The angle of attack error signal is combined with rotation bias and path damping signals from block 18 in a summing circuit 20. As is well known in this art, the rotation bias and path damping signals are normally provided to initiate the climbout maneuver and to stabilize the system thereby preventing phugoid aircraft oscillation. The output from summer 20 is, thus, an angle of attack error signal with associated bias and damping signals.

A switch 22, as provided in the flight deck, is actuable to either a land or a go-around position depending upon the desired maneuver. In the land position, signals provided by the landing approach guidance block 24 are passed through a summer 26, which adds appropriate pitch rate signals from pitch rate block 28 thereby, as is generally understood in this art, avoiding additional sources of instability, and is selected as the elevator command signal $\delta_{EC}$. If a go-around maneuver is desired, the switch 22 is thrown to its appropriate position whereby the angle of attack error signal with suitable damping signals is routed to the summer 26, with the combined signal being provided as the elevator command signal $\delta_{EC}$. In this mode, any deviations of the aircraft's angle of attack from that as commanded by the optimum lift computer will result in an elevator command signal which tends to alter the aircraft's angle of attack until the desired optimum lift condition is realized.

The elevator command signal $\delta_{EC}$ is passed to the aircraft's flight control systems 29. Here, the $\delta_{EC}$ signal could be used to drive a flight director system pilot guidance display, thereby allowing the pilot to manually fly the aircraft in accordance with the $\delta_{EC}$ command, or the $\delta_{EC}$ signal could be directly coupled to the aircraft's control surfaces (such as the elevators) to automatically fly the aircraft in accordance with the $\delta_{EC}$ command.

While the system of FIG. 1 provides rate of climb and longitudinal acceleration as required to optimize the aircraft's climbout performance, it may result, at higher thrust to weight ratios, in accelerations which reach values of several knots per second. This rapid acceleration is undesirable to some aircraft operators since it tends to increase pilot work load due to the requirements of manual operation of the flaps to keep pace with the rapidly increasing speed of the aircraft at a time when pilot work pressure is at a peak, such as during a missed approach.

It is desirable, therefore, to provide a limit to longitudinal acceleration. Moreover, if, due to excess thrust and to limits imposed upon acceleration, an excessive pitch attitude develops, a means of limiting the pitch attitude to values compatible with passenger comfort may also be desired.

SUMMARY OF THE INVENTION

It is an object of this invention, therefore, to provide an aircraft lift control system which includes a means for limiting aircraft acceleration.

It is a further object of the invention to provide the above-described aircraft lift control system including a means to limit aircraft pitch attitude.

Briefly, according to the invention, apparatus which produces an aircraft vertical path guidance signal $\alpha_{REF}$ includes a means for providing a signal $\dot{h}$ representative of aircraft vertical velocity and a means for providing a signal $a_x$ representative of aircraft longitudinal acceleration. Processing means processes the $a_x$ signal to thereby produce a signal $a_{xL}$. A combiner predeterminedly combines the $\dot{h}$ signal with the $a_{xL}$ signal and a lift computer predeterminedly produces a reference lift angle of attack signal $\alpha_{REF}$ as a predetermined function of the combined $\dot{h}$ and $a_{xL}$ signals.

Preferably, the lift computer produces the $\alpha_{REF}$ signal as a continuously variable function of ($\dot{h}$-$a_{xL}$) between predetermined minimum and maximum angle of attack values. Also, the processing means includes a means for limiting the $a_{xL}$ signal to a substantially lower value in response to the aircraft reaching a predetermined altitude.

DETAILED DESCRIPTION OF THE PREFERRED EMBODIMENT OF THE INVENTION

Figure 1:
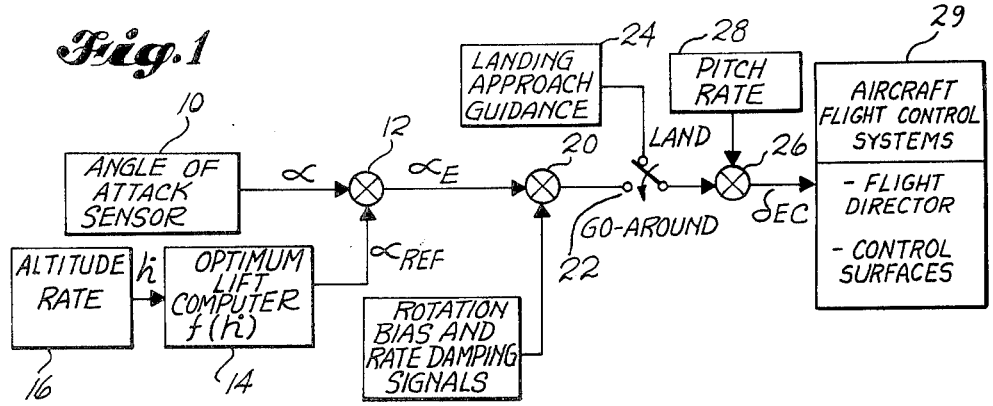
FIG. 1 is a block diagram illustrating the basic components of an aircraft optimum lift control system.

FIG. 1, as is more thoroughly discussed hereinabove, discloses an aircraft lift control system wherein an angle of attack error signal $\alpha_{68}$ is produced by comparing the aircraft's actual angle of attack, from sensor 10, with a commanded optimum lift angle of attack signal $\alpha REF$ provided by the optimum lift computer 14. The angle of attack error signal $\alpha_\epsilon$ utilized (along with aircraft stability signals) as an elevator command signal $\delta_{EC}$. The elevator command signal $\delta_{EC}$ is passed to the aircraft's flight control systems 29. Here, the $\delta_{EC}$ signal could be used to drive a flight director system pilot guidance display, thereby allowing the pilot to manually fly the aircraft in accordance with the $\delta_{EC}$ command, or the $\delta_{EC}$ signal could be directly coupled to the aircraft's control surfaces (such as the elevators) to automatically fly the aircraft in accordance with the $\delta_{EC}$ command.

Figure 2:
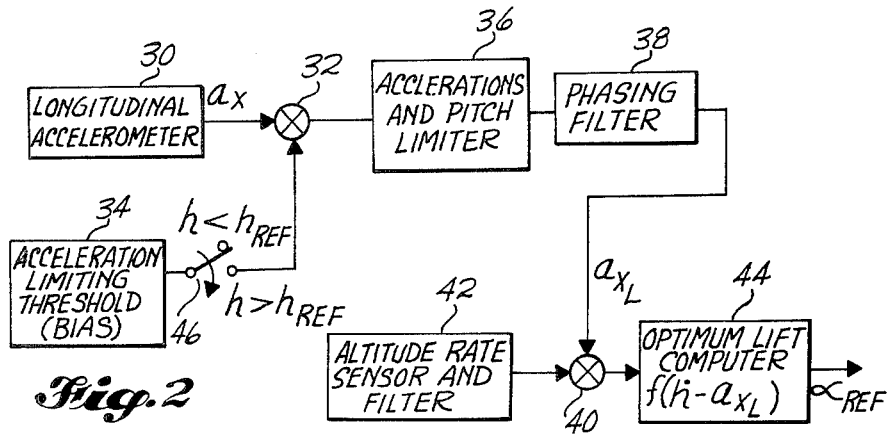
FIG. 2 is a block diagram illustrating apparatus for producing an aircraft path guidance signal for use in the overall system of FIG. 1 wherein the lift command signal incorporates acceleration and pitch attitude limiting.

FIG. 2 depicts, in block diagram form, the apparatus required to produce an improved $\alpha_{REF}$ signal which may be used in the overall system of FIG. 1. Specifically, the $\alpha_{REF}$ signal as provided by the apparatus of FIG. 2 incorporates acceleration and pitch attitude limiting.

Referring to FIG. 2, a longitudinal accelerometer block 30 produces an output signal $a_x$ which is representative of aircraft longitudinal acceleration. Block 30 may be realized by placing a conventional accelerometer along the longitudinal axis of the aircraft thereby detecting aircraft forward acceleration.

The acceleration signal $a_x$ is processed, in a manner discussed more completely hereinbelow, by processing circuitry including summer 32, acceleration limiting threshold circuitry 34, acceleration and pitch limiter circuitry 36 and phasing filter circuitry 38 such that a signal $a_{xL}$ is produced. The processed acceleration signal $a_{xL}$ is combined in a summer circuit 40 with the output from the altitude rate sensor and filter circuit 42. Altitude rate sensor and filter circuit 42, which is of conventional design, produces an output altitude rate signal $\dot{h}$ representative of the vertical velocity of the aircraft.

The summer 40 combines the altitude rate signal with the processed acceleration signal in a sense such that a composite signal $(\dot{h} - a_{xL})$ is produced. This composite signal is passed as an input to the optimum lift computer 44. The optimum lift computer 44 produces an output angle of attack command signal $\alpha_{REF}$ as a function of the composite signal $(\dot{h} - a_{xL})$.

Figure 4:
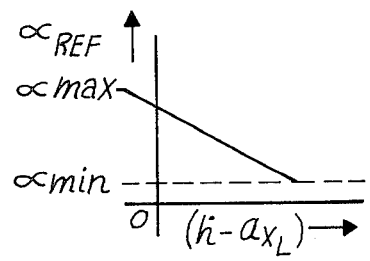
FIG. 4 is a graph illustrating the input/output characteristics of the optimum lift computer of FIG. 2.

FIG. 4 is a graph illustrating the input/output characteristic of the optimum lift computer 44 of FIG. 2. Here, it is seen that the $\alpha_{REF}$ signal is a continuously variable function of the composite signal $(\dot{h} - a_{xL})$ between certain minimum and maximum angle of attack references $\alpha_{min}$, $\alpha_{max}$, respectively.

It should be observed from the graph of FIG. 4 that an increase in aircraft acceleration, i.e. an increase of the signal $\alpha_{xL}$, results in a decreased composite signal $(h - a_{xL})$, whereby the lift computer 44 of FIG. 2 will command a larger angle of attack, which process effectively provides a limit to aircraft acceleration. As is discussed hereinabove, a reduced acceleration may be desired to reduce pilot work load, such as during a missed approach maneuver.

Referring again to FIG. 2, when the aircraft reaches a predetermined altitude $h_{REF}$ (e.g., 800 feet), a switch 46 couples an acceleration limiting threshold bias signal from block 34 to the summer circuit 32. The signal from acceleration limiting threshold circuitry 34 is selected such that it modifies the $a_{xL}$ to a lower level, or even a null value. If, for example, the processed acceleration signal $a_{xL}$ is reduced to zero by the selected value of the acceleration limiting threshold bias, the optimum lift computer produces an ouput angle of attack reference signal $\alpha_{REF}$ which is no longer dependent on acceleration. Thus, for this example, once the aircraft has reached an altitude representative of a reduced pilot work load, the system is free to command full acceleration.

During the initial phase of climbout, during which the system incorporates acceleration limiting, engine thrust may cause the aircraft to assume higher than desired pitch attitudes. To avoid excessive pitch attitudes, the acceleration and pitch limiter circuitry 36 is employed.

Figure 3:
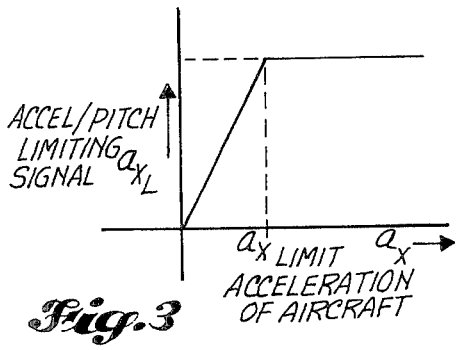
FIG. 3 is a graph illustrating the input/output characteristics of the acceleration and pitch limiter of FIG. 2.

FIG. 3 depicts the input/output characteristics of the acceleration and pitch limiter circuit 36 of FIG. 2. As shown, an increasing acceleration signal $a_x$ results in a linearly increasing processed signal $a_{xL}$ until a limit acceleration $a_{xlimit}$ is reached. The limit $a_{xlimit}$ is chosen at that aircraft acceleration which results in excessive pitch attitude. Thus, as shown in FIG. 3, increases in aircraft acceleration beyond the $a_{xlimit}$ do not result in an increase of the acceleration/attitude limiting signal $a_{xL}$. This, as may be understood with reference to the optimum lift computer 44, FIG. 2, and its input/output characteristics of FIG. 4, results in an essentially constant level of the $\alpha_{REF}$ signal, providing a limit to the aircraft pitch attitude.

Finally, a phasing filter 38 is of conventional design, and provides smoothing and proper phasing for overall system stability of the signal at the output of the acceleration and pitch limiter circuitry.

In summary, apparatus for providing an aircraft vertical path guidance signal has been disclosed, which apparatus includes aircraft acceleration and pitch attitude limiting.

While a preferred embodiment of the invention has been described in detail, it should be apparent that many modifications and variations thereto are possible, all of which fall within the true spirit and scope of the invention.

I claim:

1. Apparatus for producing an aircraft vertical path guidance signal $\alpha_{REF}$, the apparatus comprising:
   means for providing a signal $\dot{h}$ representative of aircraft vertical velocity;
   means for providing a signal $a_x$ representative of aircraft longitudinal acceleration;
   processing means for processing said $a_x$ signal and producing a signal $a_{xL}$;
   combiner means for predeterminedly combining said $\dot{h}$ signal with said $a_{xL}$ signal;
   lift computer means for producing a reference lift angle of attack signal $\alpha_{REF}$ as a predetermined function of said combined $\dot{h}$ and $a_{xL}$ signals;
   means for providing a signal $\alpha$ representative of said aircraft's actual angle of attack;
   means for producing an error signal $\alpha_E$ corresponding to the difference between said reference lift angle of attack signal $\alpha_{REF}$ and said actual angle of attack signal $\alpha$; and
   utilization means for utilizing said $\alpha_E$ signal to control the flight path of said aircraft.

2. The apparatus of claim 1 wherein the combiner means includes means for subtracting the $a_{xL}$ from the h signal,
   and wherein the lift computer means includes means for producing said $\alpha_{REF}$ signal as a continuoulsy variable function of $(\dot{h} - a_{xL})$ between predetermined minimum and maximum angle of attack values $\alpha_{min}$ and $\alpha_{max}$, respectively.

3. The apparatus of either of claims 1 or 2 wherein the processing means includes means for producing said signal $a_{xL}$ as a linearly increasing function of the $a_x$ signal up to a limit acceleration value $a_{xlimit}$, at which point the signal $a_{xL}$ is held constant for further increases in the signal $a_x$.

4. The apparatus of either of claims 1 or 2 wherein the processing means further includes means for decreasing the $a_{xL}$ signal to a predetermined value in response to the aircraft reaching a predetermined altitude.

5. The apparatus of claim 4 wherein the processor means includes means for producing said signal $a_{xL}$ as a linearly increasing function of the $a_x$ signal up to a limit acceleration value $a_{xlimit}$, at which point the signal $a_{xL}$ is held constant for further increases in the signal $a_x$.

* * * * *